United States Patent

Eguchi

[11] Patent Number: 5,914,745
[45] Date of Patent: Jun. 22, 1999

[54] ELECTRONIC WHITE BOARD APPARATUS

[75] Inventor: Kazuhiro Eguchi, Kasuga, Japan

[73] Assignee: Matsushita Electric Industrial Co., Ltd., Osaka, Japan

[21] Appl. No.: 08/989,154

[22] Filed: Dec. 11, 1997

[30] Foreign Application Priority Data

Dec. 13, 1996 [JP] Japan .................................. 8-333300

[51] Int. Cl.⁶ .................................................. G03B 27/00
[52] U.S. Cl. ........................ 347/262; 347/264; 358/488; 358/413
[58] Field of Search ................................. 347/242, 262, 347/263, 264; 358/501, 514, 488, 413

[56] References Cited

U.S. PATENT DOCUMENTS 5,023,705  6/1991  Kondo et al. .......................... 358/501
5,564,845  10/1996  Yamaguchi et al. ..................... 400/582

FOREIGN PATENT DOCUMENTS 62-56000  11/1987  Japan .
6-94238   11/1994  Japan .

*Primary Examiner*—N. Le
*Assistant Examiner*—Hai C. Pham
*Attorney, Agent, or Firm*—Stevens, Davis, Miller & Mosher, L.L.P.

[57] ABSTRACT

In an electronic white board apparatus, when at power on a screen is not in a screen home position, the screen is moved in a first direction. When the screen reaches the home position during a predetermined movement thereof, the screen is stopped. If the screen does not reach the home position even after it has been moved more than the predetermined movement, the screen is moved in the opposite to the first direction until the screen reaches the home position.

4 Claims, 5 Drawing Sheets

$$\ell = \frac{2\pi R}{4} + \frac{2\pi r}{4}$$

$$\ell = \frac{2\pi r}{4} + \frac{2\pi R}{4}$$

ical white board apparatus; and

ELECTRONIC WHITE BOARD APPARATUS

BACKGROUND OF THE INVENTION

1. Field of the Invention

This invention relates to an electronic white board apparatus which is capable of copying information such as characters and figures from a screen onto a recording paper.

2. Description of the Related Art

There has been already known an electronic white board apparatus which can read information from a screen and print the same onto a recording paper as disclosed in Japanese Patent Examined Publication No. 62-56000. Further, there has recently been proposed an apparatus in which a screen loop is folded back to provide four screen parts on which information is to be drawn, as disclosed in Japanese Patent Examined Publication No. 6-94238.

FIGS. 7 to 10 are illustrations showing the structure of a conventional electronic white board apparatus. Reference numeral 1 denotes a screen; 2, a screen driving roller for driving the screen 1; and 3a, 3b, 3c, screen folding rollers for folding the screen 1. A screen driving pulse motor (not shown) is connected to the screen driving roller 2 for rotating the screen driving roller 2 in the forward or reverse direction so as to move the screen 1. Reference numerals 5a, 5b, 5c, 5d denote screen home position marks based on which home positions of respective screen parts (reference positions at the time of reading images on the screen parts or moving the screen part into a proper position) are decided; 6, an optical reader casing to which the screen 1 can be attached; and 7, a screen home position detecting sensor for detecting the screen home position marks to decide the home positions of the respective screen parts.

In cases where information is written on a screen part located at the front and then printed, the screen driving roller 2 is driven to move the screen 1 in the direction of an arrow A, so that the information written on the screen part is read by a read station (not shown) provided in the optical reader casing 6 and then printed out by a printer (not shown). After completing the reading, as soon as the screen home position detecting sensor 7 detects the screen home position mark 5b, the screen driving roller 2 is stopped (FIG. 8).

However, as shown in FIG. 7, if the screen 1 is left for a long period of time as it is in the condition that the screen home position mark 5a is stopped at the point facing the screen home position detecting sensor 7, a curl a is produced in that portion of the screen 1 kept in contact with the screen driving roller 2.

Likewise, curls b, c, and d are produced in the positions of the screen 1 kept in contact with the screen folding rollers 3a, 3b and 3c, respectively. If the screen 1 is fed (moved) forward from the condition of FIG. 7, the screen home position mark 5b newly arrives at the point facing the screen home position detecting sensor 7 as shown in FIG. 8. At this time, the curls a, b, c and d are also moved with the screen 1.

FIG. 9 shows, on an enlarged scale, the portion around the screen folding roller 3c of FIG. 8. If the excitation of the screen driving pulse motor is cut off to allow the screen 1 to be in free condition, since the curl a is hung on the screen folding roller 3c, the screen 1 moves by itself to the position shown FIG. 10 where the curl a is stable. This gives rise to a problem that the screen home position mark 5b is shifted from the point facing the screen home position detecting sensor 7.

To solve the above problem, it is thought to excite the screen driving pulse motor even while the screen 1 is stopped. However, if the power is turned off, the excitation of the screen driving pulse motor 4 is also cut off, and therefore there still remains such a problem that the screen home position is shifted when the power is turned off.

SUMMARY OF THE INVENTION

Usually, it is considered that, in most cases, the screen is fed forward from the state of FIG. 7 until the screen home position mark 5b arrives at the point facing the screen home position detecting sensor 7 as shown in FIG. 8, in which state the excitation of the screen driving pulse motor is cut off to allow the screen 1 to be in free condition. Therefore, it is thought that if the curl a moves to cause a shift of the screen as shown in FIG. 10, the screen home position mark 5b can be returned to a proper point facing the screen home position detecting sensor 7 by a little reverse feed of the screen (in the direction of arrow B of FIG. 8).

For this reason, it is more efficient to detect the screen home position mark by feeding the screen in the reverse direction at first than to detect the screen home position mark by feeding the screen in the forward direction at all times as in the prior art, because the time required to detect the screen home position mark can be reduced.

Based on the above reasons, the present invention is constituted in the following manner.

Namely, according to the present invention, a screen is moved in the reverse direction first of all and, if a home position is detected before the screen is moved through a predetermined distance, the screen is stopped, while if the home position is not detected even after the screen has been moved through the predetermined distance, the screen is stopped once and then moved in the forward direction until the home position is detected.

It is therefore possible to detect the home position of the screen with the minimum movement thereof.

DESCRIPTION OF THE PREFERRED EMBODIMENT

Figure 1:
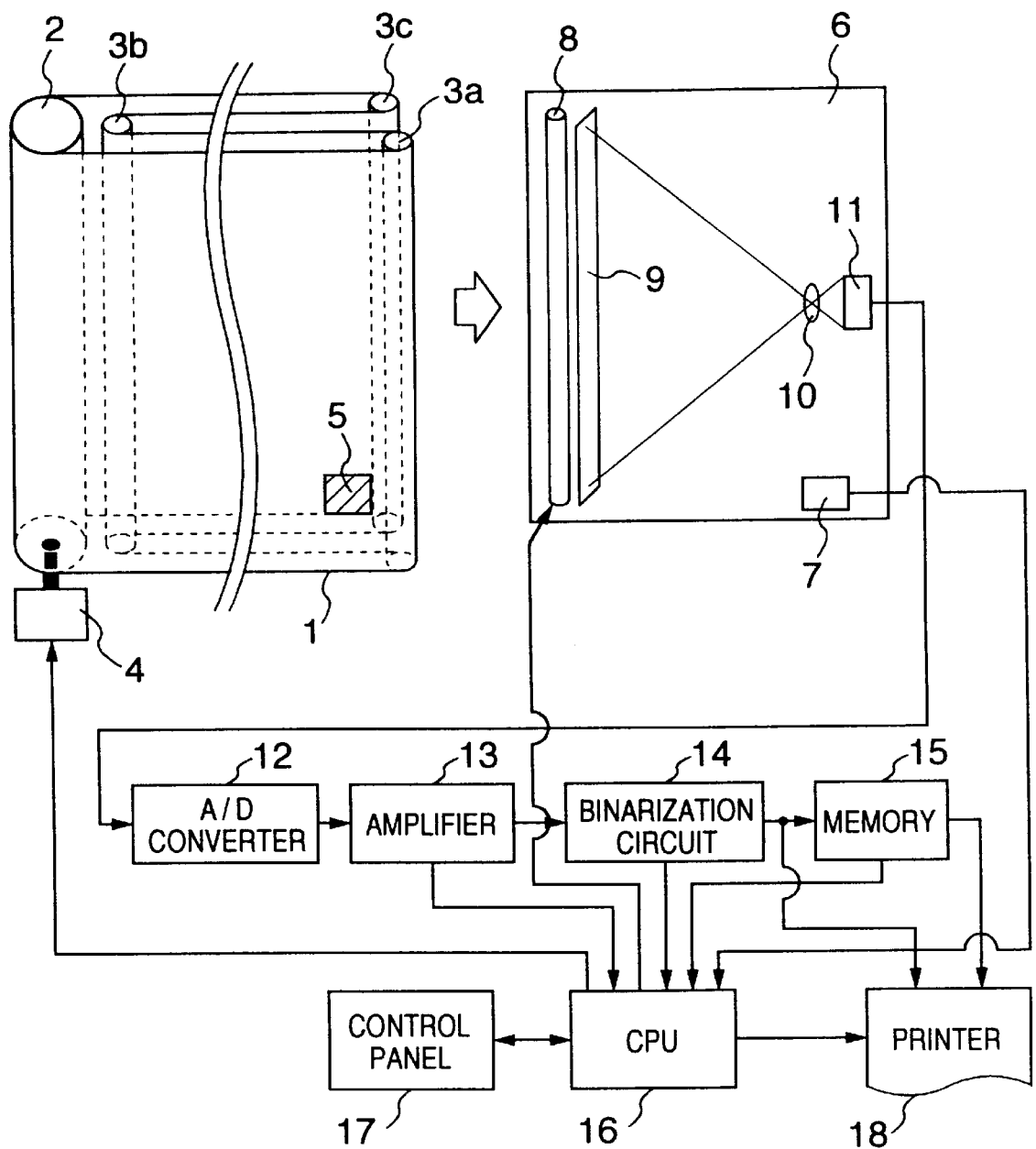
FIG. 1 is a block diagram of an electronic white board apparatus according to an embodiment of the present invention.

FIG. 1 is a block diagram of a four-plane electronic white board apparatus according to an embodiment of the present invention. Reference numeral 1 denotes a screen which has a length of four drawing planes; 2, a screen driving roller for driving the screen 1; 3a, 3b, 3c, screen folding rollers for folding the screen 1; and 4, a screen driving pulse motor connected to the screen driving roller 2 for rotating the screen driving roller 2 in the forward or reverse direction so as to move the screen 1.

Reference numeral 5 denotes a screen home position mark based on which the home position of each drawing plane (screen parts) of the screen is decided, the screen home position mark 5 being put on every plane of the screen. Reference numeral 6 denotes an optical reader casing to which the screen 1 can be attached and 7 denotes a screen home position detecting sensor installed in the optical reader casing 6 for detecting the screen home position mark to decide the home position of each plane of the screen.

Reference numeral 8 denotes a fluorescent lamp for applying light to the read portion on the screen 1; 9, a mirror for reflecting the light from the read portion at a 90-degree angle; 10, a lens for focusing the light from the read portion on a CCD 11 (which is to be described later); 11, the CCD for converting the intensity of light into the voltage (analog voltage); 12, an A/D converter for converting an analog voltage signal output from the CCD 11 into an 8-bit digital signal; 13, an amplifier circuit for amplifying a digital signal from the A/D converter 12 into another signal with an arbitrary magnification; 14, a binarization circuit for converting an 8-bit digital signal into a 0–1 two-level signal based on a predetermined threshold value; 15, an image memory for storing the read image data converted into the two-level signal by the binarization circuit 14; 16, a CPU for controlling all of the apparatus; 17, a control panel connected to the CPU 16; 18, a thermal printer capable of printing the read image data converted into the two-level signal by the binarization circuit 14 or the image data stored in the image memory 15 in response to an instruction from the CPU 16.

Figure 2:
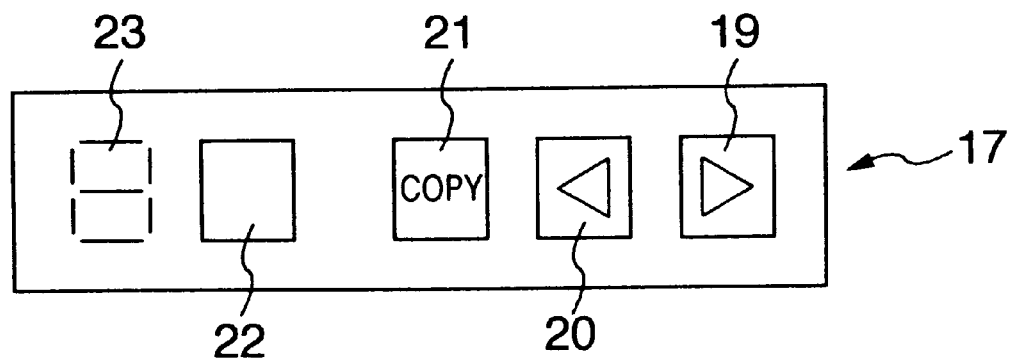
FIG. 2 is an explanatory view of a control panel of the electronic white board apparatus of FIG. 1.

FIG. 2 is an arrangement plan view of the control panel 17. Reference numeral 19 denotes a reverse feed key for moving the screen in the reverse direction; 20, a forward feed key for moving the screen in the forward direction; 21, a copy key for reading the image drawn on the screen and outputting the same to the thermal printer 18; 22, a key for setting the number of copies to be printed; and 23, a 7-segment LED for displaying the current number of copies printed.

Figure 3:
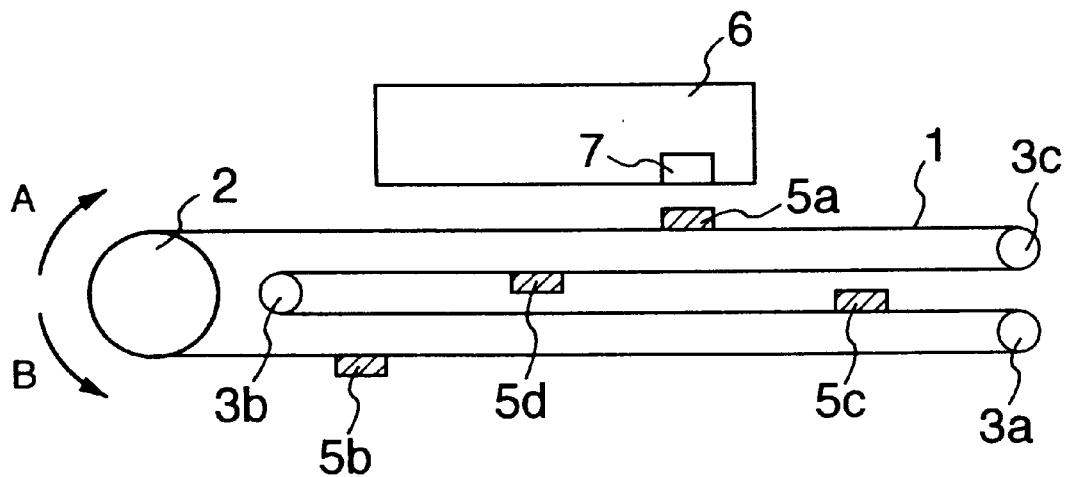
FIG. 3 is a structural view of the electronic white board apparatus of FIG. 1.

FIG. 3 is a top view of the apparatus, showing the state that the screen 1 is attached to an optical reader casing 6. Reference numeral 1 denotes a screen; 2, a screen driving roller; 3a, 3b, 3c, screen folding rollers; and 5a, 5b, 5c, 5d, screen home position marks based on which the home positions of four drawing planes (screen parts) of the screen are decided. The screen home position marks 5a, 5b, 5c and 5d are disposed equidistantly on the screen surface for the purpose of dividing the screen into four screen parts. Reference numeral 7 denotes a screen home position detecting sensor provided in the optical reader casing 6.

Now, description will be given in detail of the process performed by the four-plane electronic white board apparatus with the above construction according to the present embodiment by referring to FIGS. 1 to 3.

1. Forward Feed

As the forward feed key 20 of the control panel 17 is depressed by an operator, the CPU 16 makes the screen driving pulse motor 4 rotate clockwise so as to move the screen 1 in the direction of arrow A through the screen driving roller 2. When the screen home position mark 5b is moved to the point facing the screen home position detecting sensor 7, it detects the screen home position mark 5b and then the CPU 16 makes the screen driving pulse motor 4 stop to thereby stop the screen 1. In this way, the next plane of the screen appears.

2. Reverse Feed

As the reverse feed key 19 of the control panel 17 is depressed by the operator, the CPU 16 makes the screen driving pulse motor 4 rotate counterclockwise so as to move the screen 1 in the direction of arrow B through the screen driving roller 2. When the screen home position mark 5d is moved to the point facing the screen home position detecting sensor 7, the screen home position detecting sensor 7 detects the screen home position mark 5d and then the CPU 16 makes the screen driving pulse motor 4 stop to thereby stop the screen 1. In this way, the previous plane of the screen appears.

3. White Board Copy

As the copy key 21 of the control panel 17 is depressed by the operator, the CPU 16 makes the fluorescent lamp 8 turn on and the screen driving pulse motor 4 rotate clockwise so as to move the screen 1 in the direction of arrow A through the screen driving roller 2. While the screen 1 is moved in the direction of arrow A, information is read by the CCD 11, converted into a 0–1 two-level digital signal, printed by the thermal printer 18, and stored in the image memory 15 simultaneously. When it is set to make two or more copies by the key 22, the image data stored in the image memory 15 is fed to the thermal printer 18 to perform the printing of the second and later sheet of paper. It is noted that the resolution of reading can be changed by means of the amplifier circuit 13 or by changing the rotational speed of the screen driving pulse motor 4.

Figure 4:
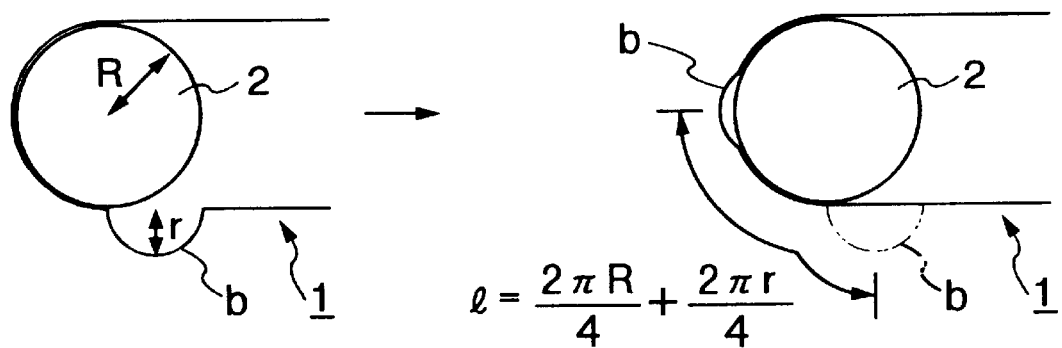
FIGS. 4 and 5 are illustrations for explaining a shift of a screen in the electronic white board apparatus of FIG. 1.
Figure 5:
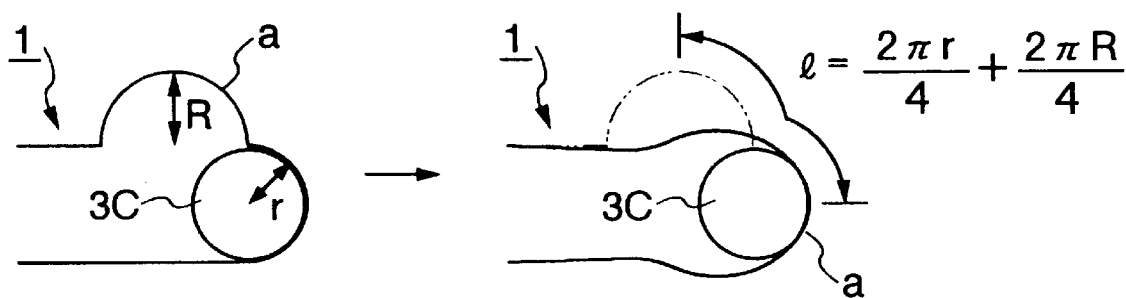

Now, description will be given of a shift of the screen 1 caused by the curl of the screen 1. FIGS. 4 and 5 show the largest shift of the screen home position caused due to the curl of the screen 1. FIG. 4 shows a shift or movement of the screen 1 resulting from a curl b, with radius r produced by the screen folding roller 3a, hung on the screen driving roller 2 with radius R. In this case, because the screen is more stable as a whole when the curl portion b with radius r is hung on the screen driving roller 2 with radius R, if the excitation of the screen driving pulse motor 4 is cut off to allow the screen 1 to be in a free condition, the screen 1 moves by itself. In this case, the maximum movement l attributed to the shift of the screen home position is $\pi(R+r)/2 = 2\pi R/4 + 2\pi r/4$.

However, $\pi(R+r)/2$ is the theoretical maximum movement. Practically, the screen 1 may stop after moving through a distance of not more than the theoretical maximum movement or after moving through a distance greater than theoretical maximum movement. Accordingly, in the present embodiment as well, the movement is not limited to $\pi(R+r)/2$ but any movement other than this can satisfactorily be dealt with.

Meanwhile, FIG. 5 shows a shift or movement of the screen 1 resulting from a curl a, with radius R produced by the screen driving roller 2, is hung on the screen folding roller 3c with radius r. In this case as well, the maximum movement l attributed to the shift of the screen home position is $\pi(r+R)/2 = 2\pi r/4 + 2\pi R/4$.

For this reason, if it is possible to detect the screen home position located within a distance of $\pi(r+R)/2$ when the power is turned on, the shift of the screen home position caused due to the curl of the screen 1 can be corrected with reliability. Incidentally, that the screen home position is not located within this range means that the power is turned off during the movement of the screen or the screen 1 is moved intentionally while the power is turned off. Therefore, it is thought to be most appropriate that when the power is turned on, the screen 1 is fed reversely so as to detect the next screen home position mark.

Figure 6:
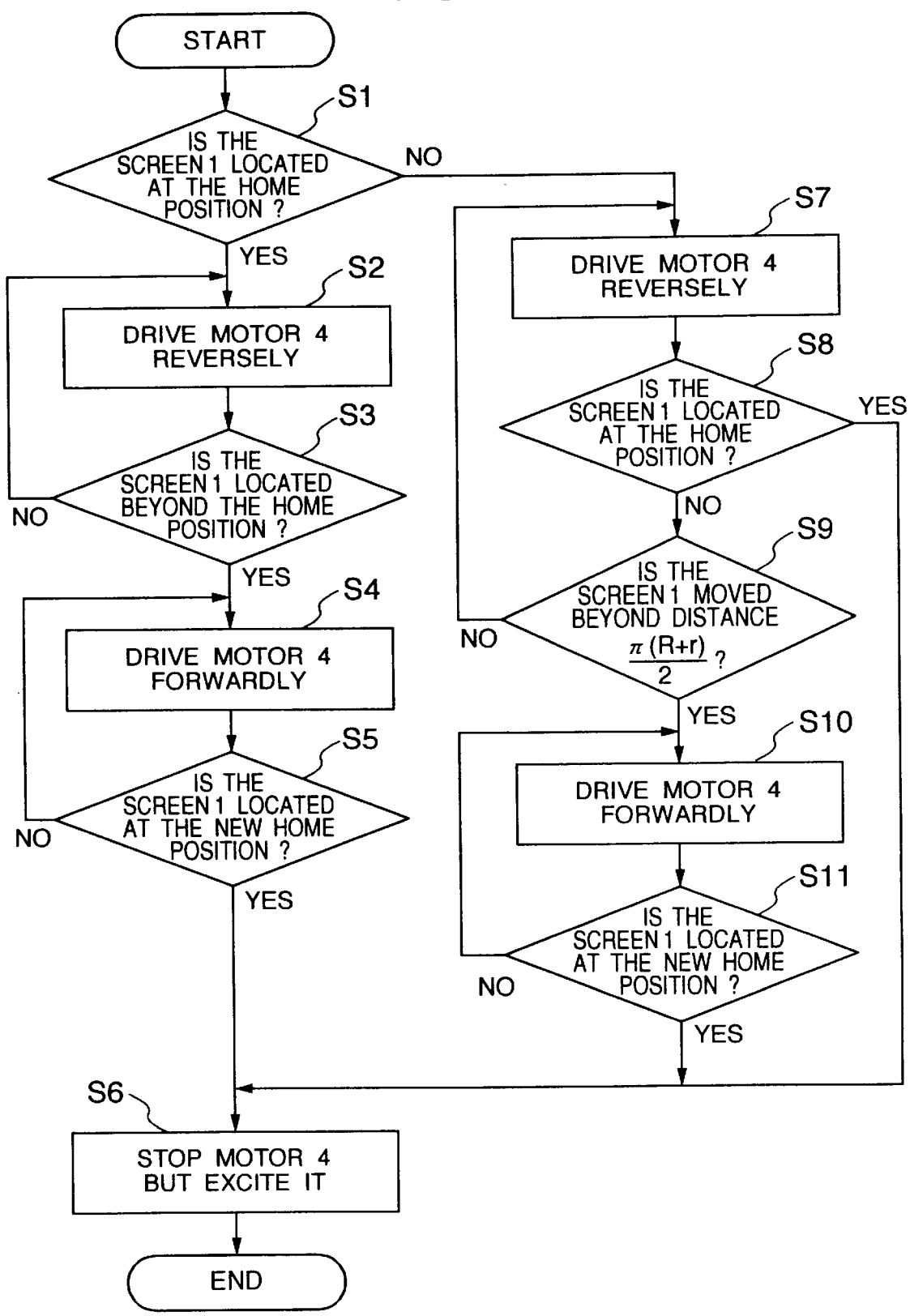
FIG. 6 is a flow chart of the operation of the electronic white board apparatus of FIG. 1.
Figure 7:
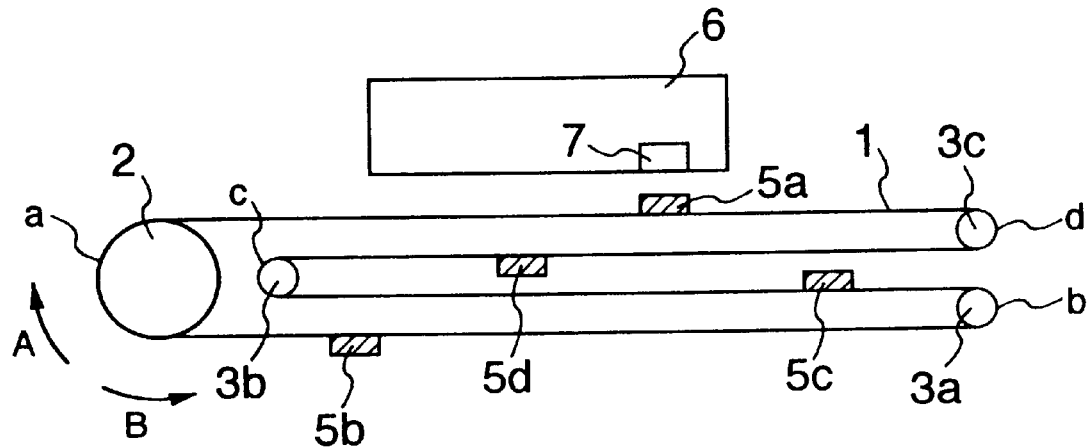
FIGS. 7 and 8 are explanatory views of a conventional electronic white board apparatus.
Figure 8:
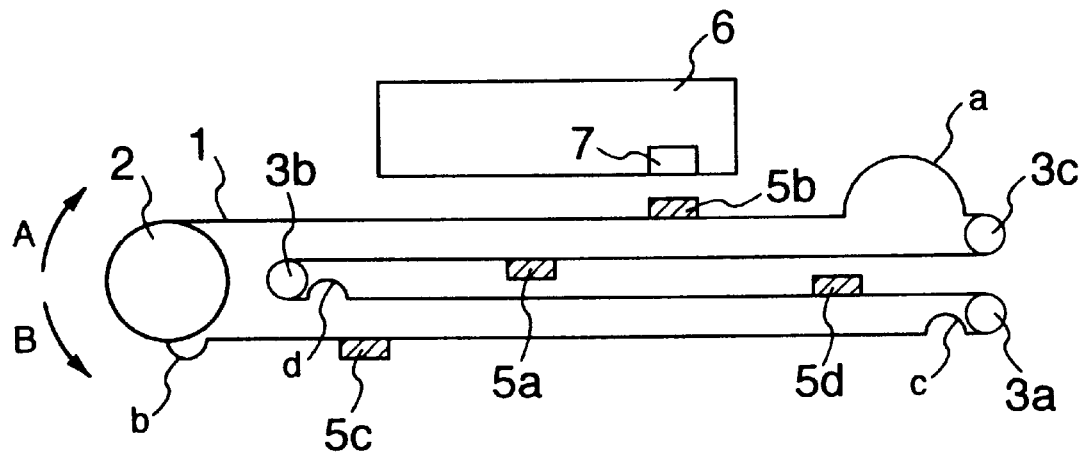
Figure 9:
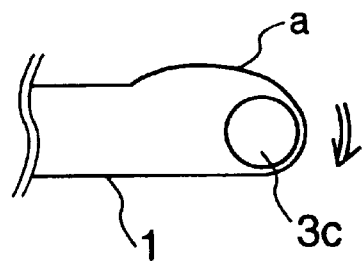
FIGS. 9 and 10 are top views showing essential portions of the conventional electronic white board apparatus.
Figure 10:
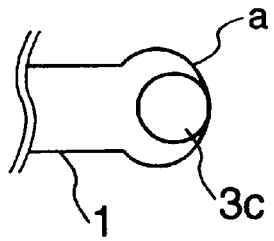

FIG. 6 is a flow chart showing a program sequence for detecting the screen home position when the power is turned on according to the present invention.

As the power is turned on, at step S1 first of all, the screen home position detecting sensor 7 detects the screen home position mark 5a so as to judge whether or not the screen 1 (or the screen panel) is located at the screen home position. If YES, namely the screen panel is located at a screen home position, the process proceeds to step S2. The CPU 16 makes the screen driving pulse motor 4 rotate in the reverse direction at step S2. In step S3, it is detected whether the screen 1 is moved out of the screen home position. If YES, namely the screen 1 becomes out of the screen home position, the process proceeds to step S4. At step S4, the CPU 16 makes the screen driving pulse motor 4 rotate in the forward direction. At step S5, the screen home position detecting sensor 7 detects the next screen home position mark 5b so as to judge whether or not the screen 1 is located at a screen home position. If YES, namely the new screen panel is located at a screen home position, the process proceeds to step S6. At step S6, the screen driving pulse motor 4 is stopped while being exited.

Even if the screen home position mark 5a is detected by the detecting sensor 7 when the power is turned on, there is a possibility of occurrence of a shift of the screen 1. According to this embodiment, to move the screen 1 and to detect the next screen home position mark 5b enable the screen to be set in an exact screen home position.

On the other hand, if the screen 1 is not at the home position when the power is turned on, namely if NO at step S1. The process proceeds to step S7. The CPU 16 makes the screen driving pulse motor 4 rotate in the reverse direction at step S7. If the screen home position mark 5a is detected by the sensor 7 (Step 8), the process proceeds to step 6 in which the screen driving pulse motor 4 is stopped while being exited. In case that the screen home position mark 5a is not detected by the sensor 7 (or if NO at step S8) and the screen 1 is moved beyond a distance $\pi(r+R)/2$ (or if YES at step S9), the process proceeds to step S10. At step S10, the CPU 16 makes the screen driving pulse motor 4 rotate in the forward direction. At step S11, the screen home position detecting sensor 7 detects any screen home position mark (or YES at step S11), which means that the screen 1 is in a new home position, and the process proceeds to step 6 in which the screen driving pulse motor 4 is stopped while being exited.

In this way, the shift of the screen 1 in the forward or reverse direction when the power is turned off, a maximum amount of which shift would be $\pi(r+R)/2$, can be detected in the shortest time after the power is turned on. Further, if the screen 1 cannot be located at a proper home position within a movement thereof $\pm\pi(r+R)/2$, it is possible to move the screen 1 into the next screen home position.

As has been described above, according to the electronic white board apparatus of the present invention, after the screen is moved, if the home position is detected before the screen is moved through a predetermined distance, the screen is stopped, while if the home position is not detected even after the screen has been moved through the predetermined distance, the screen is moved in the forward direction until the home position is detected, and therefore it is advantageously possible to perform the detection of the home position of the screen with the minimum movement thereof.

What is claimed is:

1. An electronic white board apparatus comprising;
   a medium having a plurality of surfaces onto which information is to be drawn by a user;
   a roller for moving said medium;
   means for reading said information;
   a printer for printing said information read by said reading means;
   a plurality of marks, one of said marks being provided on each of said surfaces;
   a sensor for detecting said to judge when said medium is located in positions; and
   means for controlling said roller to move said medium, said controlling means operating, in a start mode, (i) to control said roller to begin moving said medium in a first direction, and to stop said roller when said sensor detects one of said marks before said medium moves a predetermined distance in said first direction, and (ii) to control said roller to move said medium in a second direction opposite to said first direction when said sensor does not detect said one of said marks before said medium is moved in said first direction by said predetermined distance and thereafter to stop said roller when said sensor detects any one of said marks.

2. An electronic white board apparatus according to claim 1, wherein said predetermined distance is based on a diameter of said roller.

3. An electronic white board apparatus according to claim 1, where said predetermined distance is equal to $2\pi r/4 + 2\pi R/4$ where r is a radius of a curl of said medium near said roller when said medium is in a rest condition and R is a diameter of said roller.

4. An electronic white board apparatus according to claim 1, wherein said first direction is a forward direction and said second direction is a reverse direction of movement of said medium.

* * * * *